US012449316B2

(12) United States Patent
Yuan et al.

(10) Patent No.: US 12,449,316 B2
(45) Date of Patent: Oct. 21, 2025

(54) TEMPERATURE MEASUREMENT SYSTEM, TEMPERATURE MEASUREMENT METHOD, AND NON-TRANSITORY COMPUTER READABLE STORAGE MEDIUM

(71) Applicant: Chicony Electronics Co., Ltd., New Taipei (TW)

(72) Inventors: Shang-Yuan Yuan, New Taipei (TW); Tung-Hsin Huang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 553 days.

(21) Appl. No.: 17/879,352

(22) Filed: Aug. 2, 2022

(65) Prior Publication Data
US 2023/0266180 A1    Aug. 24, 2023

(30) Foreign Application Priority Data
Feb. 24, 2022    (TW) .................................. 111106879

(51) Int. Cl.
*G01K 15/00*      (2006.01)
*G06T 7/20*       (2017.01)
*G06T 7/80*       (2017.01)

(52) U.S. Cl.
CPC .............. *G01K 15/005* (2013.01); *G06T 7/20* (2013.01); *G06T 7/80* (2017.01)

(58) Field of Classification Search
CPC ............ G01K 15/005; G06T 7/80; G06T 7/20
(Continued)

(56) References Cited

U.S. PATENT DOCUMENTS 3,456,111 A * 7/1969 Barnes ...................... G01J 5/07
                                                    396/316
3,868,508 A * 2/1975 Lloyd .................. G01R 31/309
                                                    348/129
(Continued)

FOREIGN PATENT DOCUMENTS

CA        2530187 C  * 12/2010 ........... G06T 3/0018
CN    103335717 A   * 10/2013
(Continued)

OTHER PUBLICATIONS

17879352_Jan. 3, 2025_CN_111339951_A_H.pdf,Jun. 26, 2020.*
(Continued)

*Primary Examiner* — Peter J Macchiarolo
(74) *Attorney, Agent, or Firm* — MUNCY, GEISSLER, OLDS & LOWE, P.C.

(57) ABSTRACT

A temperature measurement system and a temperature measurement method are provided. The system includes a temperature sensor, a distance sensor, an image sensor, and a processor. The image sensor is configured to obtain an environmental image of a measurement environment. The processor is configured to perform an object detection on the environmental image and to obtain a calibration target. The distance sensor is configured to obtain a position information of the calibration target. The temperature sensor is configured to obtain an original target temperature information of the calibration target and an environmental temperature of the measurement environment. The processor obtains a calibrated target temperature information of the calibration target according to the position information of the calibration target, the original target temperature information of the calibration target, and the environmental temperature of the measurement environment.

11 Claims, 11 Drawing Sheets

(58) Field of Classification Search
USPC ............................................................ 374/1
See application file for complete search history.

(56) References Cited

U.S. PATENT DOCUMENTS

| | | | | |
|---|---|---|---|---|
| 8,853,631 | B2 * | 10/2014 | Strandemar | G01J 5/0846 |
| | | | | 250/332 |
| 9,733,081 | B2 * | 8/2017 | Zimmermann | G01C 7/00 |
| 10,408,606 | B1 * | 9/2019 | Raab | G06T 7/97 |
| 11,430,217 | B2 * | 8/2022 | Price | G06F 18/2148 |
| 11,765,323 | B2 * | 9/2023 | Steffanson | G06V 20/52 |
| | | | | 250/334 |
| 2009/0321636 | A1 * | 12/2009 | Ragucci | H04N 5/33 |
| | | | | 382/173 |
| 2021/0316669 | A1 * | 10/2021 | Wang | G01S 13/862 |

FOREIGN PATENT DOCUMENTS

| | | | | | |
|---|---|---|---|---|---|
| CN | 104236724 | A | * | 12/2014 | |
| CN | 104330075 | A | * | 2/2015 | ............ G01C 11/02 |
| CN | 104006887 | B | * | 8/2016 | |
| CN | 109029738 | A | * | 12/2018 | ................ G01J 5/10 |
| CN | 111339951 | A | * | 6/2020 | ............ G01J 5/0025 |
| CN | 111486864 | A | * | 8/2020 | ............. G01C 25/00 |
| CN | 111695227 | A | * | 9/2020 | ............. G06T 7/0002 |
| CN | 112926580 | A | * | 6/2021 | ............ G06K 9/2054 |
| CN | 113340431 | A | | 9/2021 | |
| CN | 113627473 | A | * | 11/2021 | |
| DE | 60100926 | T2 | * | 8/2004 | |
| TW | 201144768 | A | | 12/2011 | |
| WO | WO-2008130907 | A1 | * | 10/2008 | ........... A61B 5/0064 |

OTHER PUBLICATIONS

17879352_Jan. 3, 2025_CN_111486864_A_H.pdf,Aug. 4, 2020.*
17879352_Jan. 3, 2025_CN_112926580_A_H.pdf,Jun. 8, 2021.*
17879352_Jan. 3, 2025_CN_113627473_A_H.pdf,Nov. 9, 2021.*
17879352_Jan. 3, 2025_DE_60100926_T2_H.pdf,Aug. 12, 2004.*
17879352_Jan. 7, 2025_CN_111695227_A_H.pdf,Sep. 22, 2020.*
17879352_Jan. 13, 2025_CA_2530187_C_H.pdf,Dec. 7, 2010.*
17879352_Jan. 13, 2025_CN_103335717_A_H.pdf,Oct. 2, 2013.*
17879352_Jan. 13, 2025_CN_104006887_B_H.pdf,Aug. 31, 2016.*
17879352_Jan. 13, 2025_CN_104236724_A_H.pdf,Dec. 24, 2014.*
17879352_Jan. 13, 2025_CN_104330075_A_H.pdf,Feb. 4, 2015.*
17879352_Jan. 13, 2025_CN_109029738_A_H.pdf,Dec. 18, 2018.*
17879352_Jan. 13, 2025_WO_2008130907_A1_H.pdf,Oct. 30, 2008.*

* cited by examiner

| A2 | | | | | A1 | | | | | | A2 | | | |
|---|---|---|---|---|---|---|---|---|---|---|---|---|---|---|
| 30.8 | 30.8 | 30.5 | 30.5 | 30.0 | 33.9 | 34.0 | 33.6 | 34.1 | 34.3 | 35.1 | 30.8 | 30.7 | 30.6 | 30.4 | 30.1 |
| 30.4 | 30.1 | 30.3 | 34.0 | 33.7 | 33.8 | 33.7 | 33.7 | 33.7 | 33.7 | 33.8 | 33.7 | 33.9 | 30.2 | 30.4 | 30.3 |
| 30.8 | 30.5 | 33.7 | 33.7 | 33.8 | 33.7 | 33.7 | 33.6 | 33.7 | 33.8 | 34.2 | 34.5 | 34.2 | 34.2 | 30.3 | 30.3 |
| 30.8 | 34.0 | 34.3 | 33.9 | 33.8 | 33.9 | 33.8 | 34.0 | 33.8 | 33.9 | 33.9 | 34.3 | 34.4 | 34.0 | 34.0 | 30.4 |
| 30.7 | 34.5 | 34.8 | 34.5 | 34.1 | 34.1 | 34.2 | 34.1 | 34.7 | 34.5 | 34.6 | 34.6 | 34.8 | 35.0 | 35.0 | 30.8 |
| 35.1 | 34.2 | 34.1 | 33.6 | 33.9 | 34.5 | 33.9 | 33.7 | 33.7 | 34.0 | 33.8 | 33.7 | 33.9 | 33.6 | 33.9 | 33.7 |
| 34.7 | 34.2 | 34.6 | 34.5 | 34.7 | 34.4 | 34.3 | 34.5 | 34.5 | 34.7 | 35.1 | 34.9 | 35.0 | 35.1 | 34.9 | 34.6 |
| 35.1 | 33.9 | 34.1 | 34.1 | 34.1 | 34.4 | 34.4 | 34.3 | 34.4 | 34.3 | 34.7 | 34.7 | 35.1 | 35.0 | 34.9 | 34.9 |
| 35.0 | 35.1 | 35.0 | 34.9 | 34.3 | 34.7 | 34.6 | 34.4 | 34.4 | 34.3 | 34.5 | 34.6 | 34.6 | 34.5 | 34.0 | 34.0 |
| 35.2 | 34.5 | 34.3 | 33.8 | 33.8 | 34.0 | 34.2 | 34.2 | 34.0 | 34.2 | 33.9 | 33.9 | 33.9 | 34.1 | 34.1 | 34.3 |
| 35.2 | 35.1 | 34.8 | 34.8 | 34.7 | 34.3 | 34.1 | 34.3 | 34.5 | 34.9 | 34.5 | 34.3 | 34.3 | 34.3 | 34.5 | 33.9 |
| 30.8 | 35.0 | 35.1 | 35.1 | 35.0 | 34.8 | 34.4 | 34.2 | 34.5 | 34.5 | 34.4 | 35.0 | 34.8 | 34.6 | 34.8 | 30.8 |
| 30.7 | 35.1 | 34.9 | 34.4 | 34.0 | 33.7 | 33.7 | 34.1 | 34.1 | 34.2 | 34.7 | 34.8 | 34.9 | 34.9 | 34.6 | 30.6 |
| 30.5 | 30.6 | 35.0 | 34.3 | 34.6 | 34.4 | 35.2 | 34.3 | 34.3 | 34.8 | 34.7 | 34.9 | 34.7 | 34.5 | 30.6 | 30.7 |
| 30.8 | 30.2 | 30.5 | 34.0 | 33.7 | 33.9 | 33.9 | 33.6 | 34.2 | 34.0 | 33.8 | 33.7 | 33.9 | 30.5 | 30.5 | 30.7 |
| 30.9 | 30.7 | 30.3 | 30.5 | 30.4 | 33.9 | 34.0 | 33.7 | 33.6 | 34.0 | 33.6 | 34.4 | 30.5 | 30.6 | 30.5 | 30.7 |

| | | | | | | | | | | | | | | |
|---|---|---|---|---|---|---|---|---|---|---|---|---|---|---|
| 37.2 | 37.3 | 36.4 | 36.4 | 35.1 | 35.4 | 35.5 | 35 | 35.7 | 35.9 | 36.7 | 37.2 | 37 | 36.7 | 36.2 | 35.5 |
| 36.3 | 35.5 | 36 | 35.5 | 35.1 | 35.3 | 35.1 | 35.2 | 35.2 | 35.1 | 35.1 | 35.1 | 35.4 | 35.8 | 36.2 | 36 |
| 37.3 | 36.4 | 35.2 | 35.2 | 35.2 | 35.2 | 35.2 | 35.1 | 35.2 | 35.3 | 36.1 | 36.1 | 35.8 | 35.8 | 36.1 | 36 |
| 37.2 | 35.6 | 35.9 | 35.4 | 35.3 | 35.4 | 35.3 | 35.5 | 35.3 | 35.4 | 35.9 | 35.9 | 36 | 35.5 | 35.5 | 36.2 |
| 37 | 36.1 | 36.5 | 36.1 | 35.6 | 35.7 | 35.8 | 35.6 | 36.3 | 36.1 | 36.3 | 36.3 | 36.5 | 36.7 | 36.8 | 37.2 |
| 36.8 | 35.8 | 35.6 | 35.1 | 35.4 | 36.1 | 35.5 | 35.2 | 35.2 | 35.5 | 35.2 | 35.2 | 35.4 | 35.1 | 35.4 | 35.2 |
| 36.4 | 35.8 | 36.3 | 36.1 | 36.4 | 36.1 | 35.9 | 36.1 | 36.1 | 36.4 | 36.6 | 36.6 | 36.8 | 36.8 | 36.6 | 36.2 |
| 36.9 | 35.4 | 35.6 | 35.7 | 35.6 | 36 | 36 | 35.9 | 36 | 35.9 | 36.3 | 36.4 | 36.9 | 36.7 | 36.6 | 36.6 |
| 36.8 | 36.9 | 36.7 | 36.6 | 35.9 | 36.4 | 36.2 | 36.1 | 36 | 35.8 | 36.1 | 36.3 | 36.2 | 36.1 | 35.6 | 36.5 |
| 37 | 36.2 | 35.8 | 36.3 | 35.2 | 35.5 | 35.7 | 35.8 | 35.5 | 35.8 | 35.5 | 35.4 | 35.4 | 35.6 | 35.7 | 35.9 |
| 37 | 36.9 | 36.5 | 36.5 | 36.4 | 35.9 | 35.7 | 35.9 | 36.1 | 36.6 | 36.2 | 35.9 | 35.9 | 35.9 | 36.1 | 35.4 |
| 37.2 | 36.8 | 36.9 | 36.8 | 36.7 | 36.5 | 36 | 35.7 | 36.2 | 36.2 | 36 | 36.5 | 36.7 | 36.2 | 36.5 | 37.3 |
| 37 | 36.9 | 36.6 | 36 | 35.5 | 35.1 | 35.2 | 35.7 | 35.6 | 35.8 | 36.3 | 36.6 | 36.5 | 36.6 | 36.3 | 36.8 |
| 36.5 | 36.8 | 36.7 | 35.8 | 36.3 | 36 | 36.9 | 35.9 | 35.9 | 36.5 | 36.4 | 36.4 | 36.6 | 36.1 | 36.8 | 36.9 |
| 37.2 | 35.8 | 36.6 | 35.5 | 35.1 | 35.4 | 35.5 | 35 | 35.7 | 35.6 | 35.3 | 35.5 | 35.2 | 36.4 | 36.6 | 36.9 |
| 37.4 | 37 | 36 | 36.5 | 36.3 | 35.5 | 35.5 | 35.2 | 35.1 | 35.1 | 35.1 | 36.2 | 36.4 | 36.8 | 36.5 | 36.3 |

Fig. 8

|   |   |   | A4 |   |   |   | A3 |   |   |   | A4 |   |   |   |
|---|---|---|---|---|---|---|---|---|---|---|---|---|---|---|
| 19.3 | 19.2 | 19.8 | 19.8 | 19.9 | 12.0 | 12.6 | 12.7 | 12.2 | 12.3 | 11.7 | 19.6 | 19.4 | 19.5 | 19.3 | 19.5 |
| 19.9 | 19.1 | 19.8 | 12.7 | 12.3 | 11.5 | 12.0 | 12.5 | 12.1 | 12.0 | 11.4 | 11.4 | 11.5 | 19.7 | 19.7 | 19.6 |
| 19.8 | 19.7 | 12.3 | 12.3 | 11.8 | 12.3 | 12.7 | 12.8 | 12.1 | 12.1 | 11.7 | 11.3 | 12.1 | 12.0 | 19.9 | 19.7 |
| 19.6 | 12.7 | 12.1 | 12.3 | 12.6 | 12.1 | 11.9 | 11.6 | 11.9 | 12.0 | 12.1 | 11.6 | 11.3 | 11.3 | 11.4 | 19.6 |
| 19.5 | 12.8 | 12.5 | 12.3 | 12.0 | 12.3 | 12.4 | 11.9 | 11.1 | 11.3 | 11.3 | 11.3 | 11.5 | 11.1 | 11.3 | 19.3 |
| 12.2 | 11.4 | 11.2 | 11.1 | 11.0 | 11.8 | 11.3 | 10.9 | 10.5 | 10.8 | 11.1 | 10.6 | 10.5 | 10.9 | 10.8 | 10.9 |
| 11.6 | 11.6 | 11.4 | 11.0 | 11.2 | 11.8 | 11.9 | 11.8 | 11.8 | 11.5 | 11.6 | 11.6 | 11.4 | 10.9 | 10.7 | 11.1 |
| 12.1 | 12.5 | 11.9 | 11.7 | 11.6 | 11.5 | 11.7 | 11.7 | 11.5 | 11.8 | 11.1 | 11.0 | 10.9 | 11.2 | 10.9 | 10.9 |
| 11.6 | 11.6 | 11.7 | 11.6 | 11.2 | 11.3 | 11.1 | 11.8 | 11.8 | 11.8 | 11.4 | 11.1 | 11.0 | 11.1 | 11.1 | 10.8 |
| 10.7 | 10.7 | 10.6 | 11.5 | 11.5 | 11.5 | 11.1 | 10.7 | 11.0 | 11.1 | 10.5 | 10.8 | 10.7 | 10.5 | 10.7 | 10.8 |
| 11.2 | 10.7 | 11.0 | 11.2 | 11.1 | 11.3 | 11.4 | 10.9 | 10.7 | 11.0 | 11.4 | 11.2 | 11.5 | 11.6 | 11.0 | 11.3 |
| 19.8 | 11.6 | 10.8 | 11.5 | 11.2 | 11.0 | 11.5 | 11.3 | 11.6 | 11.3 | 11.1 | 11.1 | 11.2 | 10.9 | 10.8 | 19.6 |
| 19.1 | 10.9 | 10.6 | 10.5 | 10.5 | 11.1 | 10.6 | 10.4 | 11.4 | 11.3 | 10.7 | 10.9 | 10.9 | 10.7 | 10.8 | 18.7 |
| 19.1 | 18.8 | 10.8 | 11.5 | 11.5 | 11.2 | 10.4 | 10.4 | 10.5 | 11.0 | 10.8 | 10.7 | 11.2 | 10.9 | 18.9 | 18.9 |
| 18.9 | 19.7 | 18.8 | 10.4 | 10.4 | 10.8 | 10.4 | 10.6 | 11.0 | 11.9 | 11.0 | 11.6 | 11.0 | 18.8 | 18.8 | 18.8 |
| 19.2 | 19.0 | 19.3 | 18.8 | 18.8 | 10.6 | 10.8 | 10.9 | 11.9 | 10.8 | 10.9 | 18.8 | 19.2 | 18.9 | 19.2 | 19.1 |
|   |   |   | A4 |   |   |   |   |   |   |   | A4 |   |   |   |   |

Fig. 9

|     |     |     |     |     |     |     |     |     |     |     |     |     |     |     |
|-----|-----|-----|-----|-----|-----|-----|-----|-----|-----|-----|-----|-----|-----|-----|
| 8.5 | 8.3 | 9.8 | 9.8 | 10.0| 9.0 | 9.8 | 9.8 | 9.3 | 9.4 | 8.7 | 9.4 | 8.8 | 9.1 | 8.8 | 9.0 |
| 9.9 | 8.0 | 9.8 | 9.9 | 9.4 | 8.4 | 9.1 | 9.6 | 9.2 | 9.0 | 8.3 | 8.3 | 8.4 | 9.5 | 9.4 | 9.3 |
| 9.8 | 9.6 | 9.4 | 9.3 | 8.7 | 9.3 | 9.8 | 9.9 | 9.2 | 9.2 | 8.7 | 8.2 | 9.2 | 9.0 | 10.0| 9.6 |
| 9.3 | 9.9 | 9.1 | 9.4 | 9.7 | 9.1 | 8.9 | 8.6 | 9.0 | 9.0 | 9.2 | 8.5 | 8.1 | 8.2 | 8.3 | 9.3 |
| 9.0 | 9.9 | 9.6 | 9.4 | 9.1 | 9.3 | 9.5 | 8.9 | 8.0 | 8.2 | 8.2 | 8.2 | 8.4 | 8.0 | 8.2 | 8.6 |
| 9.3 | 8.2 | 8.1 | 7.9 | 7.8 | 8.7 | 8.2 | 7.7 | 7.3 | 7.5 | 7.9 | 7.3 | 7.2 | 7.7 | 7.6 | 7.7 |
| 8.5 | 8.6 | 8.2 | 7.8 | 8.1 | 8.8 | 8.9 | 8.8 | 8.8 | 8.4 | 8.6 | 8.5 | 8.3 | 7.7 | 7.5 | 8.0 |
| 9.2 | 9.6 | 8.9 | 8.7 | 8.6 | 8.4 | 8.7 | 8.7 | 8.4 | 8.8 | 7.9 | 7.8 | 7.8 | 8.1 | 7.8 | 7.7 |
| 8.5 | 8.5 | 8.6 | 8.5 | 8.1 | 8.2 | 7.9 | 8.8 | 8.8 | 8.8 | 8.3 | 8.0 | 7.8 | 8.0 | 8.0 | 7.6 |
| 7.5 | 7.4 | 7.3 | 8.5 | 8.4 | 8.4 | 7.9 | 7.4 | 7.8 | 7.9 | 7.2 | 7.6 | 7.5 | 7.2 | 7.4 | 7.6 |
| 8.1 | 7.4 | 7.8 | 8.1 | 7.9 | 8.2 | 8.3 | 7.7 | 7.5 | 7.8 | 8.3 | 8.1 | 8.4 | 8.5 | 7.8 | 8.2 |
| 9.8 | 8.6 | 7.6 | 8.4 | 8.1 | 7.8 | 8.4 | 8.2 | 8.5 | 8.1 | 7.9 | 8.0 | 8.0 | 7.7 | 7.6 | 9.3 |
| 7.9 | 7.7 | 7.3 | 7.3 | 7.2 | 7.9 | 7.3 | 7.2 | 8.3 | 8.3 | 7.5 | 7.8 | 7.7 | 7.4 | 7.6 | 7.1 |
| 8.1 | 7.2 | 7.5 | 8.5 | 7.9 | 8.0 | 7.1 | 7.0 | 7.2 | 7.8 | 7.6 | 7.5 | 8.1 | 7.7 | 7.4 | 7.5 |
| 7.5 | 9.4 | 7.2 | 7.1 | 7.8 | 7.6 | 7.1 | 7.3 | 7.9 | 9.0 | 7.8 | 8.5 | 7.9 | 7.3 | 7.2 | 7.1 |
| 8.3 | 7.7 | 8.4 | 7.2 | 7.3 | 7.4 | 7.6 | 7.8 | 8.9 | 7.6 | 7.7 | 7.4 | 8.2 | 7.5 | 8.3 | 8.0 |

Fig. 10

TEMPERATURE MEASUREMENT SYSTEM, TEMPERATURE MEASUREMENT METHOD, AND NON-TRANSITORY COMPUTER READABLE STORAGE MEDIUM

CROSS-REFERENCE TO RELATED APPLICATION

This non-provisional application claims priority under 35 U.S.C. § 119 (a) to patent application No. 111106879 filed in Taiwan, R.O.C. on Feb. 24, 2022, the entire contents of which are hereby incorporated by reference.

BACKGROUND

Technical Field

The instant disclosure relates to a temperature measurement system, in particular, to a temperature measurement system, a temperature measurement method, and a non-transitory computer readable storage medium which are capable of performing temperature calibration.

Related Art

Temperature measurement apparatuses are widely used in industrial and medical fields. The temperature measurement apparatuses include contact-type sensors and noncontact-type sensors. The contact-type sensors may be thermocouple sensors, thermistor sensors, or resistor temperature detectors. The noncontact-type sensors may be infrared sensors. The infrared sensors can detect the surface temperature of an object which is between −70° C. and 1000° C., thus being widely used in industrial fields. In industrial fields, the temperature measurement apparatuses can detect and control the temperature of the manufacturing equipment, thus allowing the manufacturing process to meet the temperature control requirements. In medical fields, the temperature measurement apparatuses can detect the temperature of a human body in a remote measurement manner. Therefore, the temperature measurement of the human body can be achieved in a noncontact manner. Moreover, the temperature measurement may even be applied to parts of the human body. These temperature measurement apparatuses have to be calibrated, so that the temperature information output from the apparatus can meet the actual temperature. Especially, it should be noted that, the noncontact temperature measurement apparatuses would have deviations in different extents owing to the position difference of the measurement target and the influence of the application environment.

SUMMARY

In view of this, in one or some embodiments, a temperature measurement system is provided. The system comprises a temperature sensor, a distance sensor, an image sensor, and a processor. The image sensor is configured to obtain an environmental image of a measurement environment. The processor is configured to perform an object detection on the environmental image and to obtain a calibration target. The distance sensor is configured to obtain a position information of the calibration target. The temperature sensor is configured to obtain an original target temperature information of the calibration target and an environmental temperature of the measurement environment. The processor is coupled to the image sensor, the distance sensor, and the temperature sensor. The processor obtains a calibrated target temperature information of the calibration target according to the position information of the calibration target, the original target temperature information of the calibration target, and the environmental temperature of the measurement environment.

In one or some embodiments, a temperature measurement method is provided. The method comprises following steps: capturing an environmental image of a measurement environment; performing an object detection on the environmental image to and obtain a calibration target; obtaining a position information of the calibration target; obtaining an original target temperature information of the calibration target and an environmental temperature of the measurement environment; and obtaining a calibrated target temperature information according to the position information of the calibration target, the original target temperature information of the calibration target, and the environmental temperature of the measurement environment.

In one or some embodiments, a non-transitory computer readable storage medium is provided. The storage medium is adapted to store one or more programs. The program comprises a plurality of instructions. When the instructions are executed by one or more processing circuits of an electronic device, the electric device performs a temperature measurement method. The temperature measurement method comprises the following steps: capturing an environmental image of a measurement environment; performing an object detection on the environmental image and to obtain a calibration target; obtaining a position information of the calibration target; obtaining an original target temperature information of the calibration target and an environmental temperature of the measurement environment; and obtaining a calibrated target temperature information according to the position information of the calibration target, the original target temperature information of the calibration target, and the environmental temperature of the measurement environment.

Based on the above, in the temperature measurement system, the temperature measurement method, and the non-transitory computer readable storage medium according to one or some embodiments of the instant disclosure, the initially measured temperature (the target temperature) can be calibrated according to the position information of the calibration target and the environmental temperature of the measurement environment. Therefore, the calibrated temperature (the calibrated target temperature) can be close to the actual temperature of the calibration target. Hence, the influences owing to the distance between the calibration target and the temperature measurement system, the angle of the calibration target with respect to the temperature measurement system, and the environmental temperature can be reduced, thereby improving the accuracy of the temperature measurement and reducing the measurement deviations.

For better understanding the contents of the instant disclosure, exemplary embodiments are provided along with accompanying drawings.

BRIEF DESCRIPTION OF THE DRAWINGS

The disclosure will become more fully understood from the detailed description given herein below for illustration only, and thus not limitative of the disclosure, wherein:

FIG. 7 illustrates a schematic diagram showing the original target temperature information before the calibration according to an exemplary embodiment of the instant disclosure;

FIG. 8 illustrates a schematic diagram showing the calibrated target temperature information after the calibration according to an exemplary embodiment of the instant disclosure;

FIG. 9 illustrates a schematic diagram showing the original target temperature information before the calibration according to another exemplary embodiment of the instant disclosure; and FIG. 10 illustrates a schematic diagram showing the calibrated target temperature information after the calibration according to another exemplary embodiment of the instant disclosure.

DETAILED DESCRIPTION

Figure 1:
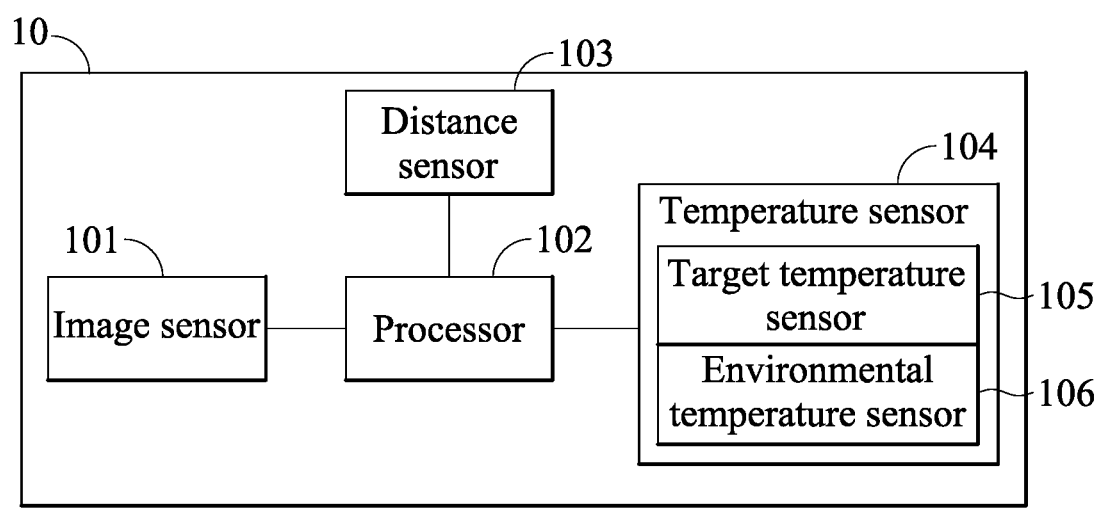
FIG. 1 illustrates a block diagram of a temperature measurement system according to an exemplary embodiment of the instant disclosure.

Embodiments are provided for facilitating the descriptions of the instant disclosure. However, the embodiments are provided as examples for illustrative purpose, but not a limitation to the instant disclosure. Some elements in the drawings are omitted for clearly showing the technical features of the instant disclosure. In all the figures, the same reference numbers refer to identical or similar elements.

Refer to FIG. 1. FIG. 1 illustrates a block diagram of a temperature measurement system 10 according to an exemplary embodiment of the instant disclosure. As shown in FIG. 1, in this embodiment, the temperature measurement system 10 comprises an image sensor 101, a processor 102, a distance sensor 103, and a temperature sensor 104. The temperature measurement system 10 is disposed at a measurement environment, such as a bedroom, an office room, an entrance/exit of a building, or the like. The image sensor 101, the distance sensor 103, and the temperature sensor 104 may be respectively coupled to the processor 102. The image sensor 101 is configured to capture an environmental image of the measurement environment. After the image sensor 101 obtains the environmental image, the image sensor 101 directly or indirectly transmits the environmental image to the processor 102. The processor 102 performs an object detection on the environmental image and to obtain a calibration target (will be described below). The distance sensor 103 is configured to obtain a position information of the calibration target in the measurement environment. The temperature sensor 104 is configured to obtain an original target temperature information of the calibration target and an environmental temperature of the measurement environment. The processor 102 obtains a calibrated target temperature information of the calibration target according to the position information of the calibration target, the original target temperature information of the calibration target, and the environmental temperature of the measurement environment (will be described below).

In some embodiments, the temperature sensor 104 further comprises a target temperature sensor 105 and an environmental temperature sensor 106. The target temperature sensor 105 is configured to obtain the original target temperature information of the calibration target in a noncontact manner (namely, in this embodiment, through a remote measurement), and the environmental temperature sensor 106 is configured to obtain the environmental temperature of the measurement environment. The target temperature sensor 105 and the environmental temperature sensor 106 are coupled with each other, and both the target temperature sensor 105 and the environmental temperature sensor 106 are coupled to the processor 102, respectively.

In some embodiments, the image sensor 101 may be one or combinations of a complementary metal oxide semiconductor (CMOS) sensor, a charge-coupled device (CCD) sensor, a thin-film transistor (TFT) sensor, and a sensor capable of obtaining images. In some embodiments, the processor 102 may be one or combinations of a central processing unit (CPU), a digital signal processor (DSP), a field programmable gate array (FPGA), and a graphics processing unit (GPU). In some embodiments, the distance sensor 103 may be one or combinations of a radar, an infrared radar, a microwave radar, and an optical radar. In some embodiments, the target temperature sensor 105 may be an infrared temperature sensor, which is capable of measuring the original target temperature information of the calibration target in a noncontact manner. The environmental temperature sensor 106 may be a thermocouple sensor or a thermistor sensor.

In some embodiments, the center of field of view (FOV) of the image sensor 101, the center of FOV of the distance sensor 103, and the center of FOV of the temperature sensor 104 (comprising the target temperature sensor 105) may be regarded as being arranged on a same axis. In other words, in some embodiments, the deviations among the center of FOV of the image sensor 101, the center of FOV of the distance sensor 103, and the center of FOV of the temperature sensor 104 (comprising the target temperature sensor 105) may be neglected. Moreover, in some embodiments, the FOV of the distance sensor 103 is greater than the FOV of the image sensor 101, and the FOV of the image sensor 101 is greater than FOV of the temperature sensor 104. In some other embodiments, the image sensor 101, the distance sensor 103, the temperature sensor 104, and the target temperature sensor 105 may have substantially the same FOV.

In some embodiments, the temperature measurement system 10 further comprises a storage unit (not shown) coupled to the processor 102. The processor 102 comprises a memory unit. The storage unit and the memory unit may be volatile memory (such as random access memory (RAM)) or non-volatile memory (such as read-only memory (ROM), flash memory, hard disk drive (HDD), or solid-state drive (SSD)). The storage unit and the memory unit may be a combination of the foregoing memories. The storage unit and the memory unit are adapted to be accessed by the processor 102 to read data stored in the storage unit and the memory unit.

Figure 2:
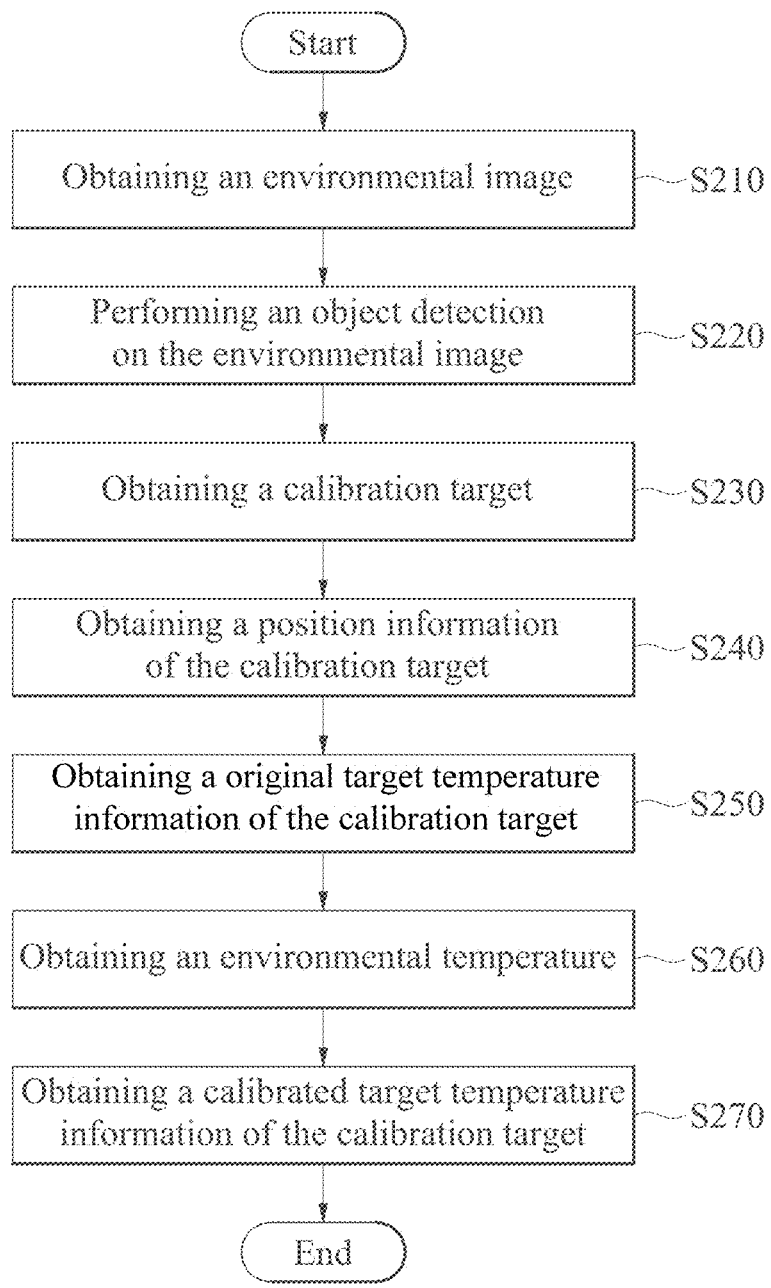
FIG. 2 illustrates a flowchart of a temperature measurement method according to an exemplary embodiment of the instant disclosure.

Refer to FIG. 2. FIG. 2 illustrates a flowchart of a temperature measurement method according to an exemplary embodiment of the instant disclosure. To clearly describe the operation of the elements shown in FIG. 1 and the temperature measurement method according to one or some embodiments of the instant disclosure, detailed descriptions are provided as below along with the flowchart illustrated in FIG. 2. However, it should be noted that the temperature measurement method according to one or some embodiments of the instant disclosure is not limited to be applied to the temperature measurement system 10 shown in FIG. 1 and not limited to the order of the steps of the flowchart shown in FIG. 2.

Refer to FIG. 1 and FIG. 2. According to one embodiment of the instant disclosure, firstly, in the step S210, the image sensor 101 obtains the environmental image of the measurement environment. The image sensor 101 captures the environmental image of the measurement environment where the image sensor 101 locates and outputs the environmental image to the processor 102. In the step S220, the processor 102 performs the object detection on the environmental image. Specifically, in one or some embodiments, after the processor 102 receives the environmental image, the processor 102 utilizes a machine learning model to execute an object detection procedure to recognize the object(s) in the environmental image. The machine learning model may be the back propagation neural network model, the convolutional neural network, the support vector machine model, classification models based on decision tree, the Bayesian classification model, or the like. The machine learning model may be stored in the storage unit for being read and executed by the processor 102.

After the processor 102 performs the object detection on the environmental image, in the step S230, the processor 102 obtains the calibration target from the environmental image. Specifically, in one or some embodiments, through the object detection procedure, the processor 102 can mark one or several objects in the environmental image. Then, the processor 102 obtains the calibration target from the one or several objects marked in the environmental image.

In the step S240, the processor 102 obtains the position information of the calibration target through the distance sensor 103. Specifically, in one or some embodiments, the distance sensor 103 can emit certain energy beams and measure the time interval between the emission of the energy beams and the reflection of the energy beams by the object in the measuring space, and the distance sensor 103 can further calculate the distance between the object and the distance sensor 103 according to the time interval. The certain energy beams may be electromagnetic waves, ultrasonic waves, light beams, or the like. The distance sensor 103 may perform distance measurement on the calibration target through the energy beams to obtain the position information of the calibration target. The position information of the calibration target comprises a target distance and a target orientational angle of the calibration target in the measurement environment. The target distance may be the distance between the calibration target and the distance sensor 103. The target orientational angle may be the angle between the connection line of the calibration target and the distance sensor 103 and the central axial line of the distance sensor 103. The distance sensor 103 may further transmit the target distance and the target orientational angle of the calibration target to the processor 102.

Next, in the step S250, the processor 102 obtains the original target temperature information of the calibration target measured by the temperature sensor 104. The temperature sensor 104 measures an object temperature information of the object. The object temperature information of the calibration target is referred as the original target temperature information. In the step S260, the processor 102 obtains the environmental temperature of the measurement environment measured by the temperature sensor 104. In other words, in one or some embodiments, after the temperature sensor 104 respectively measures the temperatures of the calibration target and the measurement environment to obtain the original target temperature information and the environmental temperature, the temperature sensor 104 transmits the original target temperature information and the environmental temperature to the processor 102. In some embodiments, the temperature sensor 104 measures the original target temperature information of the calibration target through the target temperature sensor 105 and measures the environmental temperature through the environmental temperature sensor 106, and then the temperature sensor 104 transmits the original target temperature information and the environmental temperature to the processor 102. Next, in the step S270, the processor 102 obtains a calibrated target temperature information according to the position information of the calibration target, the original target temperature information of the calibration target, and the environmental temperature of the measurement environment.

It is understood that the temperature measurement method according to one or some embodiments of the instant disclosure is not limited to the order of the steps of the flowchart shown in FIG. 2. For example, in another embodiment of the instant disclosure, the step S260 may be executed prior to the step S250 or prior to the step S210.

Figure 3A:
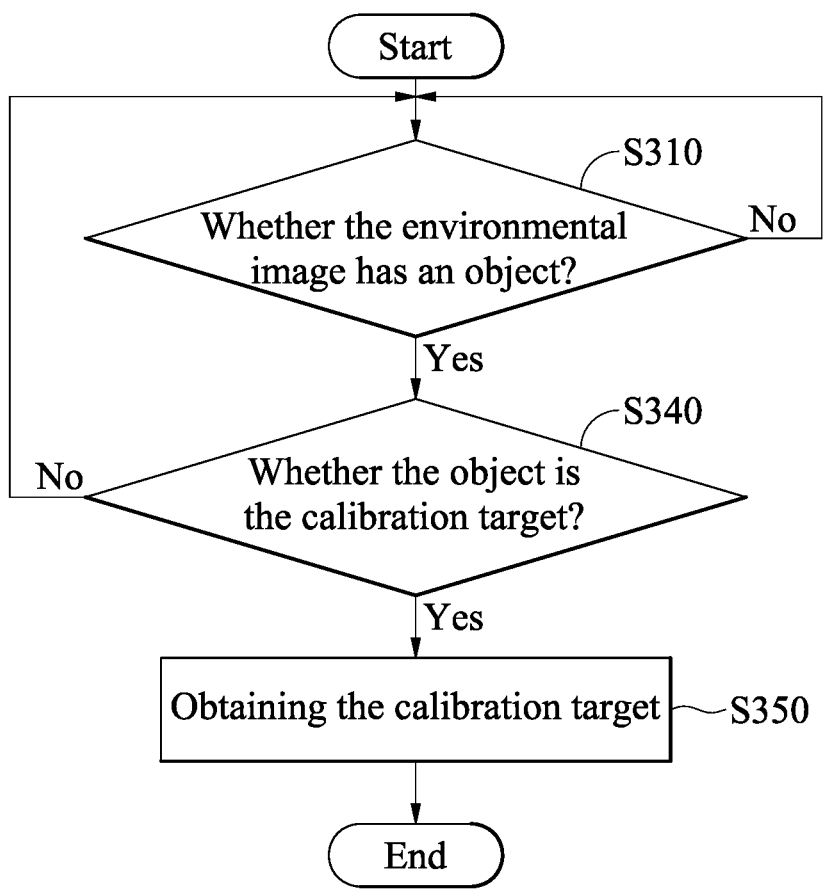
FIG. 3A illustrates a flowchart showing the step of obtaining the calibration target according to an exemplary embodiment of the instant disclosure.

Refer to FIG. 3A. FIG. 3A illustrates a flowchart showing the step of obtaining the calibration target according to an exemplary embodiment of the instant disclosure. In the step S230 shown in FIG. 2, the processor 102 obtains the calibration target from the environmental image. The steps S310 to S350 shown in FIG. 3A further describe the step S230 of FIG. 2 which indicates the process of obtaining the calibration target from the environmental image. However, it is understood that the temperature measurement method according to one or some embodiments of the instant disclosure is not limited to the orders of the steps of the flowchart shown in FIG. 3A.

Refer to FIG. 1 and FIG. 3A. In the step S310 of FIG. 3A, the processor 102 determines whether the environmental image has one or several objects. If the environmental image does not have any object (the determination result of the step S310 is no), the processor 102 again determines whether the environmental image has one or several objects; in other words, the processor 102 executes the step S310 again. If the environmental image has one or several objects (the determination result of the step S310 is yes), the processor 102 marks the object or these objects in the environmental image, and the processor 102 further provides an object position frame and an object type for the object. The object type may be object characters (such as human, animal, vehicle, electrical appliance, furniture, etc.) defined by supervised algorithms or unsupervised algorithms in the machine learning model. Next, in the step S340, the processor 102 determines whether the marked object is the calibration target. For example, the processor 102 may determine whether the object is the calibration target according to an object image feature. The object image feature may be, but not limited to, the object type, the image outline feature of the object, the illumination of the object, or the chrominance of the object. If the marked object in the environmental image meets one or more than two of the object image features, the processor 102 determines that the object meeting the object image feature is the calibration target (the determination result of the step S340 is yes), and the processor 102 obtains the calibration target (the step S350). If the marked object does not meet the object image feature, the processor 102 determines that the marked object is not the calibration target (the determination result of the step S340 is no), and the processor 102 executes the step S310 again.

Figure 3B:
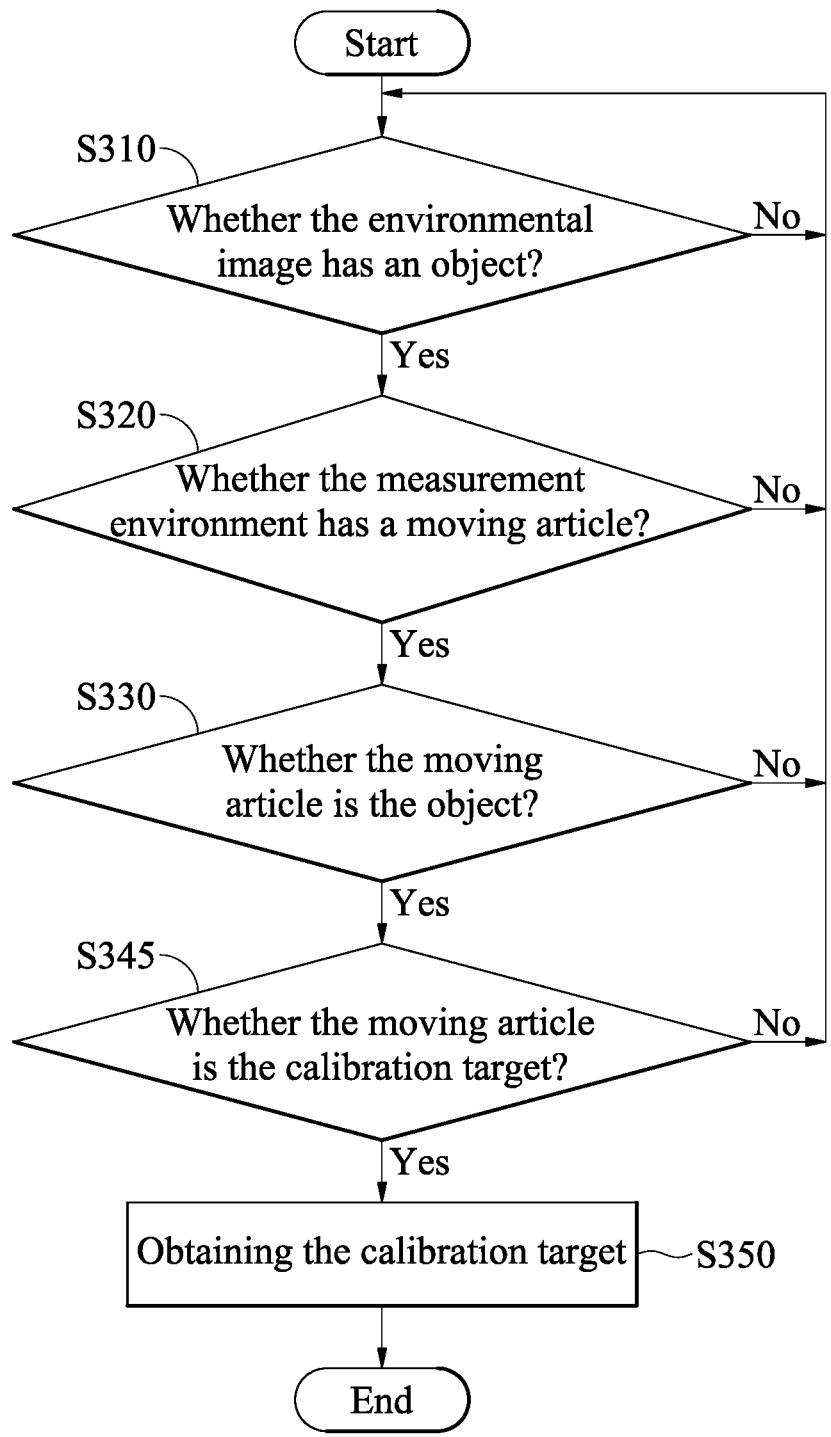
FIG. 3B illustrates a flowchart showing the step of obtaining the calibration target according to another exemplary embodiment of the instant disclosure.

Refer to FIG. 1 and FIG. 3B. FIG. 3B illustrates a flowchart showing the step of obtaining the calibration target according to another exemplary embodiment of the instant disclosure. In the step S230 shown in FIG. 2, the processor 102 obtains the calibration target from the environmental image. The steps S310 to S350 shown in FIG. 3B further describe the step S230 of FIG. 2 which indicates the process of obtaining the calibration target from the environmental image. However, it is understood that the temperature measurement method according to one or some embodiments of the instant disclosure is not limited to the orders of the steps of the flowchart shown in FIG. 3B.

The steps S310 and S350 shown in FIG. 3B are the same as the steps S310 and

S350 shown in FIG. 3A, and thus not iterated. In FIG. 3B, if the environmental image has one or several objects (the determination result of the step S310 is yes), the processor 102 marks the object or these objects in the environmental image, and the processor 102 further provides an object position frame and an object type (such as human, animal, vehicle, electrical appliance, furniture, etc.) for the object. Next, in the step S320, the processor 102 determines whether the measurement environment has one or several moving articles, that is, the processor 102 determines whether there is one or several moving objects in the measurement environment. In some embodiments, the distance sensor 103 determines whether the measurement environment has a moving article, and then the distance sensor 103 transmits the determination result to the processor 102. In some other embodiments, the processor 102 determines whether the measurement environment has a moving article through a plurality of continuous-time environmental images. If it is determined that the measurement environment does not have the moving article (the determination result of the step S320 is no), the processor 102 executes the step S310 again.

If it is determined that the measurement environment has one or several moving articles (the determination result of the step S310 is yes), in the step S330, the processor 102 determines whether the moving article or these moving articles are the object or those objects marked in the environmental image. If it is determined that the moving article is not the object marked in the environmental image (the determination result of the step S330 is no), the processor 102 executes the step S310 again. If it is determined that the moving article is the object marked in the environmental image (the determination result of the step S330 is yes), in the step S345, the processor 102 further determines whether the moving article is the calibration target. For example, the processor 102 may determine whether the moving article is the calibration target according to an object image feature. The object image feature may be, but not limited to, the object type, the image outline feature of the object, the illumination of the object, or the chrominance of the object.

If the moving article meets the object image feature, the processor 102 determines that the moving article is the calibration target (the determination result of the step S345 is yes), the processor 102 executes the step S350, and the processor 102 obtains the calibration target. If the moving article does not meet the object image feature, the processor 102 determines that the moving article is not the calibration target (the determination result of the step S345 is no), and the processor 102 executes the step S310 again.

Figure 4:
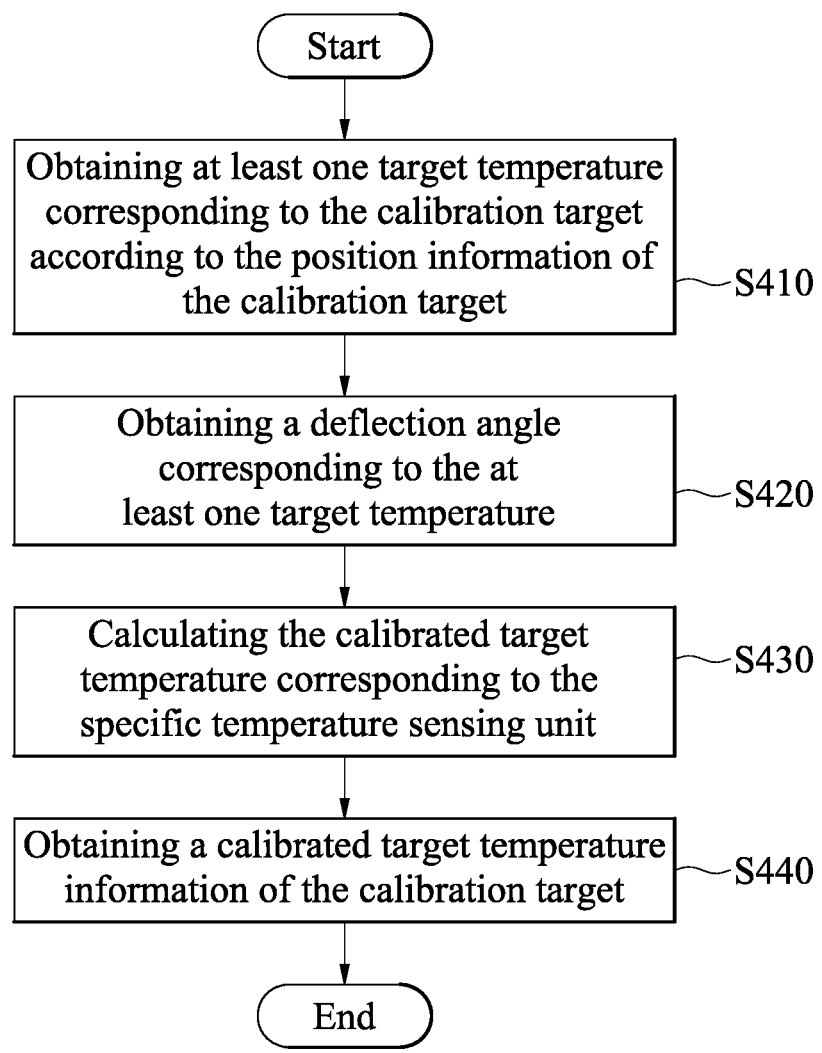
FIG. 4 illustrates a flowchart showing the step of obtaining the calibrated target temperature information of the calibration target according to an exemplary embodiment of the instant disclosure.

Refer to FIG. 4. FIG. 4 illustrates a flowchart showing the step of obtaining the calibrated temperature information of the calibration target according to an exemplary embodiment of the instant disclosure. In the step S270 shown in FIG. 2, the processor 102 obtains the calibrated target temperature information of the calibration target according to the position information of the calibration target, the original target temperature information of the calibration target, and the environmental temperature of the measurement environment. The steps S410 to S440 shown in FIG. 4 further describe the step S270 of FIG. 2 which indicates the process of obtaining the calibrated target temperature information of the calibration target. However, it is understood that the temperature measurement method according to one or some embodiments of the instant disclosure is not limited to the orders of the steps of the flowchart shown in FIG. 4.

Refer to FIG. 1 and FIG. 4. In the step S410, the processor 102 obtains at least one target temperature corresponding to the calibration target according to the position information of the calibration target. Specifically, in one or some embodiments of the instant disclosure, the temperature sensor 104 or the target temperature sensor 105 may comprise a temperature sensing array and a lens for detecting infrared. The temperature sensing array is formed by a plurality of temperature sensing units. Each of the temperature sensing units may measure an object in a noncontact manner to obtain an object temperature. The object temperature information comprises the object temperature of the object measured by the corresponding temperature sensing unit. According to the target orientational angle of the calibration target obtained in the step S240 of FIG. 2 and/or the object position frame of the calibration target obtained in the step S310 of FIG. 3A or FIG. 3B, the processor 102 obtains one or several certain temperature sensing units corresponding to the calibration target from the temperature sensing units of the temperature sensing array of the temperature sensor 104 or the target temperature sensor 105 (that is, in this embodiment, the processor 102 obtains at least one specific temperature sensing unit corresponding to the calibration target), and thus the processor 102 obtains the object temperature measured by the at least one specific temperature sensing unit (that is, in this embodiment, the processor 102 obtains at least one target temperature corresponding to the calibration target). In this embodiment, the object temperature measured by the at least one specific temperature sensing unit is referred as the target temperature. In other words, in this embodiment, the target temperature is the object temperature of the calibration target. The original target temperature information comprises the at least one target temperature.

Next, in the step S420, the processor 102 obtains a deflection angle corresponding to the at least one target temperature. In the case that a temperature sensing unit is nearer to the center of the temperature sensing array, the object temperature measured by the temperature sensing unit is closer to the actual temperature of the object. On the other hand, in the case that a temperature sensing unit is farer from the center of the temperature sensing array, a greater deviation would exist between the object temperature measured by the temperature sensing unit and the actual temperature of the object. In this step, the processor 102 further obtains one or several specific temperature sensing units corresponding to the calibration target from the temperature sensing array of the temperature sensor 104 or the target temperature sensor 105, and thus the processor 102 obtains a deflection angle of each of the specific temperature sensing units with respect to the center of the temperature sensing array.

Specifically, in one or some embodiments, according to the size of the temperature sensing array of the temperature sensor 104 or the target temperature sensor 105, the FOV of the temperature sensing array, and the positions of the temperature sensing units on the temperature sensing array, the processor 102 calculates the angle of each of the temperature sensing units deflected from a central axis of the temperature sensing array (that is, in this embodiment, the deflection angle) through trigonometric functions. Hence, according to the position information of the calibration target and/or the target position frame of the calibration target appeared upon the detection of the object, the processor 102 can identify one or several specific temperature sensing units whose positions correspond to the calibration target from the temperature sensing array and can obtain the deflection angle of the specific temperature sensing unit.

Then, in the step S430, the processor 102 calculates the calibrated target temperature corresponding to the specific temperature sensing unit. Specifically, in this embodiment, the processor 102 may perform calculation according to the position information of the calibration target, the target temperature measured by at least one specific temperature sensing unit corresponding to the calibration target, the environmental temperature, and the deflection angle of at least one specific temperature sensing unit corresponding to the calibration target to obtain at least one calibrated target temperature corresponding to the at least one specific temperature sensing unit. In the step S440, the processor 102 obtains the calibrated target temperature information. The calibrated target temperature information comprises the at least one calibration target temperature.

Based on one or some embodiments of the instant disclosure, the temperature measurement system 10 can obtain at least one calibrated target temperature according to the position information of the calibration target, the original target temperature information of the calibration target, the environmental temperature of the measurement environment, and the deflection angle of at least one specific temperature sensing unit corresponding to the calibration target. The relationship among these factors can be represented by a temperature compensation equation. In one embodiment, the temperature compensation equation may be represented as $$T_T = T_A + \frac{(T_S - T_A)}{K \times \left(1 + \frac{1}{1 + b^{-a(D-d)}}\right)},$$

where $T_T$ is the calibrated target temperature, $T_A$ is the environmental temperature, $T_S$ is the target temperature, and $T_T$, $T_A$, $T_S$ may be represented by Celsius degrees; D is the target distance in the position information of the calibration target, d is the maximum effective sensing distance of the temperature sensor 104 or the target temperature sensor 105, the unit of D and d may be centimeters; a is a coefficient, where 0<a<10; b is another coefficient, where 1<b<10; K is an angular coefficient related to the deflection angle, where 0<K≤1. The temperature compensation equation may be stored in the storage unit so as to be read and executed by the processor 102. It should be noted that the aforementioned temperature compensation equation is provided as an illustrative example, and embodiments of the instant disclosure are not limited thereto.

Figure 5:
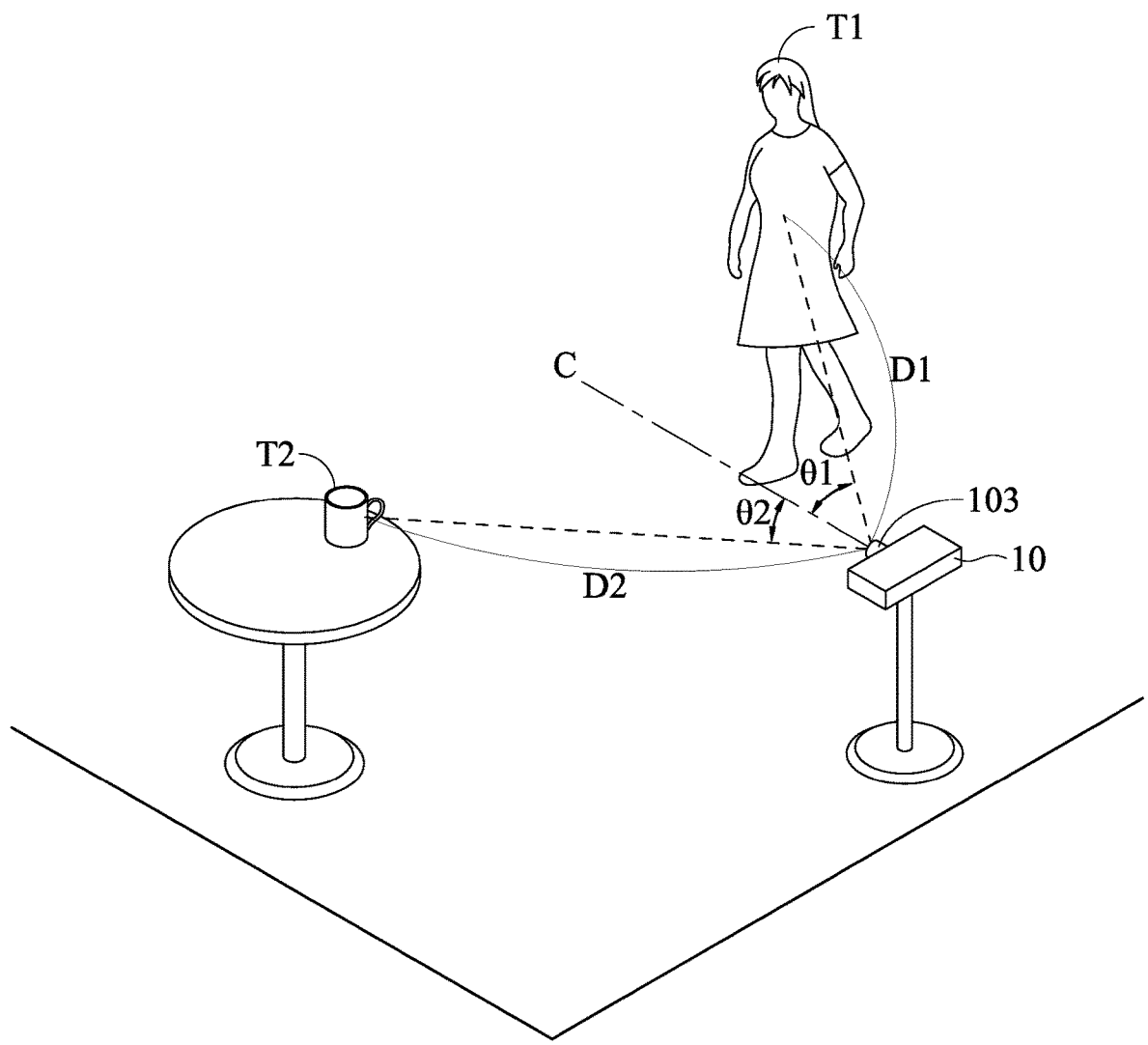
FIG. 5 illustrates a schematic view of the object in the measurement environment according to an exemplary embodiment of the instant disclosure.
Figure 6:
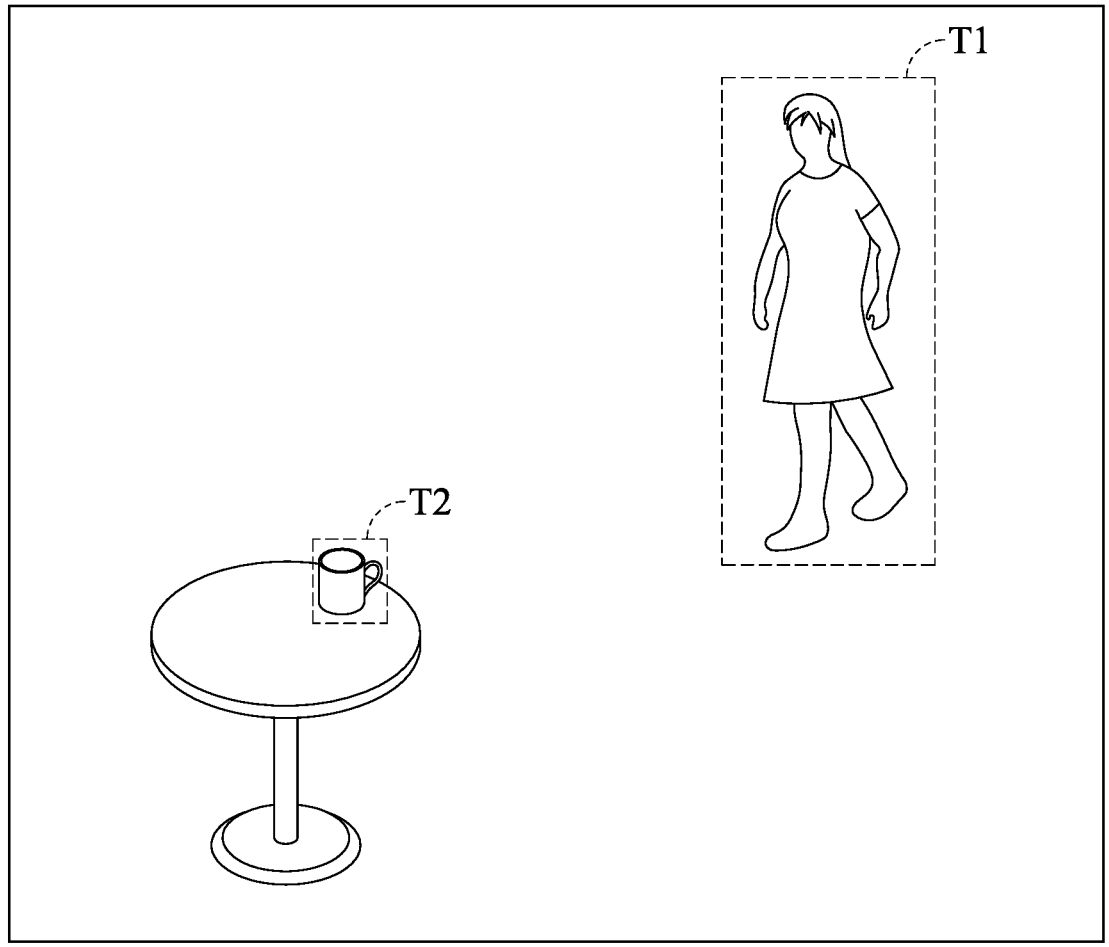
FIG. 6 illustrates a schematic view showing the object in the environmental image is marked according to an exemplary embodiment of the instant disclosure.

Refer to FIG. 5 and FIG. 6. FIG. 5 illustrates a schematic view of the objects in the measurement environment according to an exemplary embodiment of the instant disclosure. FIG. 6 illustrates a schematic view showing the objects in the environmental image are marked according to an exemplary embodiment of the instant disclosure. Refer to FIG. 1, FIG. 5, and FIG. 6. In this embodiment, there are the temperature measurement system 10, the object T1 (the human body), and the object T2 (a cup containing cold water) in the measurement environment, and both the object T1 and the object T2 are within the sensing range of the temperature measurement system 10. The temperature measurement system 10 obtains the environmental image of the measurement environment through the image sensor 101 (as shown in FIG. 6), and the temperature measurement system 10 performs the object detection on the environmental image through the aforementioned machine learning model. As shown in FIG. 6, the processor 102 marks the object T1 and the object T2 in the environmental image.

Furthermore, the temperature measurement system 10 can obtain the position information of the object T1 and the object T2 in the measurement environment through the distance sensor 103. As shown in FIG. 5, the processor 102 can obtain a distance D1 between the object T1 and the distance sensor 103 and an orientational angle θ1 of the object T1 in the measurement environment with respect to the distance sensor 103, and the processor 102 can also obtain a distance D2 between the object T2 and the distance sensor 103 and an orientational angle θ2 of the object T2 in the measurement environment with respect to the distance sensor 103. Specifically, in this embodiment, the orientational angle θ1 is the angle between the connection line of the object T1 and the distance sensor 103 and the central axial line C of the FOV of the distance sensor 103, and the orientational angle θ2 is the angle between the connection line of the object T2 and the distance sensor 103 and the central axial line C of the FOV of the distance sensor 103. The central axial line C may be an axial line extending from the center of the FOV.

Refer to FIG. 7 and FIG. 8. FIG. 7 illustrates a schematic diagram showing the original target temperature information before the calibration according to an exemplary embodiment of the instant disclosure. FIG. 8 illustrates a schematic diagram showing the calibrated target temperature information after the calibration according to an exemplary embodiment of the instant disclosure. Refer to FIG. 1 and FIG. 5 to FIG. 8. In this embodiment, the FOV of the temperature sensor 104 or the target temperature sensor 105 is less than the FOV of the image sensor 101. In this embodiment, the temperature sensing array of the temperature sensor 104 or the target temperature sensor 105 is a 16×16 array. Taking the 16×16 array as an example, the temperature sensing array comprises 256 temperature sensing units. Each of the temperature sensing units is an element of the temperature sensing array. The coverage of the lens of the temperature sensor 104 or the target temperature sensor 105 is less than the temperature sensing array. In this embodiment, the full covered viewing angle of the lens of the temperature sensor 104 or the target temperature sensor 105 is 38 degrees. The area A1 is the area of the temperature sensing array which is within the coverage of the lens, and the area A2 is the area of the temperature sensing array which is out of the coverage of the lens. In this embodiment, the object T1 is the calibration target, the temperature of the object T1 is 36 degrees Celsius, and a portion of the object T1 fills the coverage of the temperature sensing array of the temperature sensor 104 or the target temperature sensor 105. In other words, the object T1 exceeds the measurement coverage of the temperature sensing array of the temperature sensor 104 or the target temperature sensor 105. FIG. 7 and FIG. 8 illustrate that the temperature measured by each temperature sensing unit of the temperature sensing array is the object temperature of the object T1. The environmental temperature of the measurement environment is 26.5 degrees Celsius.

In this embodiment, the temperature sensor 104 or the target temperature sensor 105 has a 16×16 temperature sensing array including 256 temperature sensing units. The original target temperature information of the object T1 measured by the temperature sensor 104 or the target temperature sensor 105 is illustrated in FIG. 7. In this embodiment, because the object T1 is the calibration target and a portion of the object T1 fills the coverage of the temperature sensing array of the temperature sensor 104 or the target temperature sensor 105, the object temperatures measured by the temperature sensing units of the temperature sensing array are all the target temperature of the calibration target (the object T1). The temperature of the object T1 (the calibration target) is 36 degrees Celsius. However, as shown in FIG. 7, owing to the influences of the environmental temperature (which is 26.5 degrees Celsius), the target temperatures measured by the temperature sensing units of the temperature sensing array are all less than 36 degrees Celsius. In other words, upon measuring the temperature of an object in a noncontact manner, the measured original target temperature information may be influenced by the environmental temperature of the measurement environment. Moreover, since the temperature sensing units in the area A2 of the temperature sensing array are out of the coverage of the lens, the deviation of the target temperatures measured by the temperature sensing units in the area A2 is greater than the deviation of the target temperature measured by the temperature sensing units in the area A1. In other words, in this embodiment, the target temperatures measured by the temperature sensing units in the area A2 are more greatly influenced by the environmental temperature, thus having a greater deviation. As compared with the target temperatures measured by the temperature sensing units within the coverage of the lens (the area A1), the target temperatures measured by the temperature sensing units out of the coverage of the lens (the area A2) is closer to the environmental temperature.

Hence, in one or some embodiments, the processor 102 further determines whether each of the temperature sensing units of the temperature sensor 104 or the target temperature sensor 105 is within the coverage of the lens so as to determine whether the target temperatures measured by the temperature sensing units have greater deviations. Specifically, in one or some embodiments, the processor 102 may determine whether each of the temperature sensing units is within the coverage of the lens by using the relationship between the deflection angle of each of the temperature sensing units with respect to the center of the temperature sensing array and the full covered viewing angle of the lens. For example, the full covered viewing angle of the lens of the temperature sensor 104 or the target temperature sensor 105 is 38 degrees; that is, the half of the full covered viewing angle of the lens is 19 degrees (hereinafter, coverage angle). If the deflection angle of a temperature sensing unit with respect to the center of the temperature sensing array is greater than 19 degrees (the coverage angle), the temperature sensing unit is out of the coverage of the lens.

As shown in FIG. 7, it is noted that the target temperatures measured by the temperature sensing units in the area A2 has greater deviations (much closer to the environmental temperature), as compared with the target temperatures measured by the temperature sensing units in the area A1. Therefore, in one or some embodiments, the angular coefficient K in the aforementioned temperature compensation equation can adopt different coefficients according to the relationship between the deflection angle of the temperature sensing unit and the coverage angle of the lens. When the deflection angle is less than or equal to the coverage angle, the angular coefficient K may be a first angular coefficient; while when the deflection angle is greater than the coverage angle, the angular coefficient K may be a second angular coefficient (where the first angular coefficient is different from the second angular coefficient). For example, the full covered viewing angle of the lens is 38 degrees, and the coverage angle is half of the full covered viewing angle and is 19 degrees. When the deflection angle is less than or equal to 19 degrees, the angular coefficient K may be 0.83 (the first angular coefficient); while when the deflection angle is greater than 19 degrees, the angular coefficient K may be 0.4 (the second angular coefficient). In this embodiment, the first angular coefficient is greater than the second angular coefficient.

In other words, in one or some embodiments, in the case that the coverage of the lens of the temperature sensor 104 or the target temperature sensor 105 is less than the temperature sensing array, when the target temperatures measured by the temperature sensing units in the area A1 (the area of the temperature sensing array within the coverage of the lens) are calibrated by the aforementioned temperature compensation equation (that is, when the calibrated target temperatures corresponding to the temperature sensing units in the area A1 are calculated), the angular coefficient K is the first angular coefficient; while when the target temperatures measured by the temperature sensing units in the area A2 (the area of the temperature sensing array out of the coverage of the lens) are calibrated by the aforementioned temperature compensation equation (that is, when the calibrated target temperatures corresponding to the temperature sensing units in the area A2 are calculated), the angular coefficient K is the second angular coefficient. Accordingly, in one or some embodiments of the instant disclosure, the temperature measurement system 10 calculates and obtains the calibrated target temperature corresponding to each of the temperature sensing units by using the temperature compensation equation. As shown in FIG. 8, the calibrated target temperatures in the area A1 and the area A2 are all close to the actual temperature of the object T1 (in this embodiment, 36 degrees Celsius).

Refer to FIG. 9 and FIG. 10. FIG. 9 illustrates a schematic diagram showing the original target temperature information before the calibration according to another exemplary embodiment of the instant disclosure. FIG. 10 illustrates a schematic diagram showing the calibrated target temperature information after the calibration according to another exemplary embodiment of the instant disclosure. Refer to FIG. 1, FIG. 5, FIG. 6, FIG. 9, and FIG. 10. In this embodiment, the FOV of the temperature sensor 104 or the target temperature sensor 105 is less than the FOV of the image sensor 101. The temperature sensor 104 or the target temperature sensor 105 shown in FIG. 9 and FIG. 10 is the same as the temperature sensor 104 or the target temperature sensor 105 shown in FIG. 7 and FIG. 8. In this embodiment, the object T2 is the calibration target, the temperature of the object T2 is 10 degrees Celsius, and a portion of the object T2 fills the coverage of the temperature sensing array of the temperature sensor 104 or the target temperature sensor 105. In other words, the object T2 exceeds the measurement coverage of the temperature sensing array of the temperature sensor 104 or the target temperature sensor 105. FIG. 9 and FIG. 10 illustrate that the temperature measured by each temperature sensing unit of the temperature sensing array is the object temperature of the object T2. The environmental temperature of the measurement environment is 26.5 degrees Celsius.

The original target temperature information of the object T2 measured by the temperature sensor 104 or the target temperature sensor 105 is illustrated in FIG. 9. In this embodiment, because the object T2 is the calibration target and a portion of the object T2 fills the coverage of the temperature sensing array of the temperature sensor 104 or the target temperature sensor 105, the object temperatures measured by the temperature sensing units of the temperature sensing array are all the target temperature of the calibration target (the object T2). Owing to the influences of the environmental temperature (which is 26.5 degrees Celsius), the target temperatures measured by the temperature sensing units of the temperature sensing array are all greater than 10 degrees Celsius. Moreover, since the temperature sensing units in the area A4 of the temperature sensing array are out of the coverage of the lens, the deviation of the target temperatures measured by the temperature sensing units in the area A4 is greater than the deviation of the target temperature measured by the temperature sensing units in the area A3 (that is, the target temperatures measured by the temperature sensing units in the area A4 are more greatly influenced by the environmental temperature).

Similarly, in this embodiment, the processor 102 determines whether each of the temperature sensing units of the temperature sensor 104 or the target temperature sensor 105 is within the coverage of the lens. Moreover, in some embodiments, different angular coefficients K may be adopted according to the relationship between the deflection angle of the temperature sensing unit and the coverage angle of the lens. Accordingly, in one or some embodiments of the instant disclosure, the temperature measurement system 10 calculates and obtains the calibrated target temperature corresponding to each of the temperature sensing units by using the temperature compensation equation. In other words, in one or some embodiments, when the target temperatures measured by the temperature sensing units in the area A3 (the area of the temperature sensing array within the coverage of the lens) are calibrated by the aforementioned temperature compensation equation (that is, when the calibrated target temperatures corresponding to the temperature sensing units in the area A3 are calculated), the angular coefficient K is the first angular coefficient; while when the target temperatures measured by the temperature sensing units in the area A4 (the area of the temperature sensing array out of the coverage of the lens) are calibrated by the aforementioned temperature compensation equation (that is, when the calibrated target temperatures corresponding to the temperature sensing units in the area A4 are calculated), the angular coefficient K is the second angular coefficient. In this embodiment, the first angular coefficient is greater than the second angular coefficient. After the calibration, as shown in FIG. 10, the calibrated target temperatures in the area A3 and the area A4 are all close to the actual temperature of the object T2 (in this embodiment, 10 degrees Celsius).

In some other embodiments of the instant disclosure, in the case that the coverage of the lens of the temperature sensor 104 or the target temperature sensor 105 is greater than or equal to the temperature sensing array (that is, all the temperature sensing units of the temperature sensing array are within the coverage of the lens), the deflection angle of each of the temperature sensing units is less than or equal to the coverage angle, and the angular coefficient K in the aforementioned temperature compensation equation may be a fixed value.

The temperature measurement method may be implemented by using a computer program product (that is, in this embodiment, a software program) comprising a plurality of instructions. The computer program product may be a file which is capable of being transmitted through internets or being stored in a non-transitory computer readable storage medium. When instructions of the computer program product are executed by one or several processing circuits of an electronic device (e.g., the temperature measurement system 10), the electronic device performs the temperature measurement method. The non-transitory computer readable storage medium may be a read only memory (ROM), a flash memory, a soft drive, a hard drive, a compact disk (CD), a flash drive, a tape, a record element capable of being accessed through internets, or other storage media with the same or similar functions.

According to one or some embodiments of the instant disclosure, through the temperature measurement system 10 and the temperature measurement method, the target temperature of the object (the calibration target) detected by the temperature measurement system 10 can be calibrated. Hence, the influences owing to the distance between the object (the calibration target) and the temperature measurement system and the angle of the target (the calibration target) with respect to the temperature measurement system can be reduced. Furthermore, the influences of the environmental temperature to the measurement result can be also reduced. In one or some embodiments, by using the temperature compensation equation, the target temperature after calibration (the calibrated target temperature) can be approached to the actual temperature of the calibration target, thereby improving the accuracy of the temperature measurement and reducing the measurement deviations. Moreover, in some embodiments, the measurement deviations caused by the temperature sensing units which are not covered by the lens of the temperature sensor 104 can be further reduced.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A temperature measurement system comprising:
  an image sensor configured to obtain an environmental image of a measurement environment;
  a processor configured to perform an object detection on the environmental image and to obtain a calibration target;

a distance sensor configured to obtain a position information of the calibration target; and
a temperature sensor configured to obtain an original target temperature information of the calibration target and an environmental temperature of the measurement environment, and the temperature sensor comprises a temperature sensing array, and the temperature sensing array comprises a plurality of temperature sensing units;
wherein the processor is coupled to the image sensor, the distance sensor, and the temperature sensor, and obtains at least one specific temperature sensing unit corresponding to the calibration target from the temperature sensing units according to the position information of the calibration target, and obtains a target temperature measured by the at least one specific temperature sensing unit and a deflection angle of the at least one specific temperature sensing unit, the original target temperature information comprises the target temperature, and
the processor obtains a calibrated target temperature of a calibrated target temperature information corresponding to the at least one specific temperature sensing unit according to the position information, the deflection angle, the target temperature, and the environmental temperature.

2. The temperature measurement system according to claim 1, wherein the temperature sensor further comprises a lens; when the deflection angle is less than or equal to a coverage angle of the lens, the processor further obtains the calibrated target temperature corresponding to the at least one specific temperature sensing unit according to the position information of the calibration target, the target temperature, the environmental temperature, and a first angular coefficient;
when the deflection angle is greater than the coverage angle of the lens, the processor further obtains the calibrated target temperature corresponding to the at least one specific temperature sensing unit according to the position information of the calibration target, the target temperature, the environmental temperature, and a second angular coefficient;
wherein the first angular coefficient is different from the second angular coefficient.

3. The temperature measurement system according to claim 1, wherein the processor is further configured to determine whether the environmental image comprises an object and is further configured to determine whether the object is the calibration target according to an object image feature.

4. The temperature measurement system according to claim 3, wherein the processor is further configured to determine whether the measurement environment comprises a moving article and is further configured to determine whether the moving article is the object.

5. The temperature measurement system according to claim 1, wherein the temperature sensor further comprises:
a target temperature sensor configured to obtain the original target temperature information of the calibration target; and
an environmental temperature sensor coupled to the target temperature sensor and configured to obtain the environmental temperature of the measurement environment.

6. A temperature measurement method comprising:
capturing an environmental image of a measurement environment;
performing an object detection on the environmental image and to obtain a calibration target;
obtaining a position information of the calibration target;
obtaining an original target temperature information of the calibration target and an environmental temperature of the measurement environment, wherein the original target temperature information comprises at least one target temperature;
obtaining the at least one target temperature corresponding to the calibration target and at least one deflection angle corresponding to the at least one target temperature according to the position information of the calibration target; and
obtaining at least one calibrated target temperature of a calibrated target temperature information according to the position information, the at least one target temperature, the environmental temperature, and the at least one deflection angle.

7. The temperature measurement method according to claim 6, wherein the step of obtaining the at least one calibrated target temperature of the calibrated target temperature information according to the at least one target temperature, the environmental temperature, and the deflection angle comprises:
obtaining the at least one calibrated target temperature according to the position information of the calibration target, the at least one target temperature, the environmental temperature and a first angular coefficient when the deflection angle is less than or equal to a coverage angle; and
obtaining the at least one calibrated target temperature according to the position information of the calibration target, the at least one target temperature, the environmental temperature and a second angular coefficient when the deflection angle is greater than the coverage angle;
wherein the first angular coefficient and the second angular coefficient are determined based on the relationship between the deflection angle of the temperature sensing unit and the coverage angle of the lens, and the first angular coefficient is different from the second angular coefficient.

8. The temperature measurement method according to claim 6, wherein the step of performing the object detection on the environmental image to obtain the calibration target comprises:
determining whether the environmental image comprises an object; and
determining whether the object is the calibration target according to an object image feature.

9. The temperature measurement method according to claim 8, wherein the step of performing the object detection on the environmental image to obtain the calibration target further comprises:
determining whether the measurement environment comprises a moving article; and
determining whether the moving article is the object.

10. The temperature measurement method according to claim 6, wherein the position information of the calibration target comprises a target distance and a target orientational angle of the calibration target.

11. A non-transitory computing device readable medium adapted to store one or more programs, wherein the one or more programs comprise a plurality of instructions; when the instructions are executed by one or more processing circuits of an electronic device, the electronic device performs a temperature measurement method; the temperature measurement method comprises: capturing an environmental image of a measurement environment; performing an object detection on the environmental image and to obtain a calibration target; obtaining a position information of the calibration target; obtaining an original target temperature information of the calibration target and an environmental temperature of the measurement environment, wherein the original target temperature information comprises at least one target temperature; obtaining the at least one target temperature corresponding to the calibration target and at least one deflection angle corresponding to the at least one target temperature according to the position information of the calibration target; and obtaining at least one calibrated target temperature of a calibrated target temperature information according to the position information, the at least one target temperature, the environmental temperature, and the at least one deflection angle.

\* \* \* \* \*